United States Patent [19]

Stein et al.

[11] Patent Number: 5,360,548

[45] Date of Patent: * Nov. 1, 1994

[54] PROCESS FOR ABSORBING ORGANIC POLLUTING PRODUCTS

[75] Inventors: Claude Stein, Gouvieux; Daniel Duouenne, Clermont, both of France

[73] Assignee: Elf Atochem, S.A., Paris, France

[*] Notice: The portion of the term of this patent subsequent to Dec. 10, 2008 has been disclaimed.

[21] Appl. No.: 56,825

[22] Filed: May 3, 1993

Related U.S. Application Data

[63] Continuation of Ser. No. 582,908, Dec. 14, 1990, abandoned.

[30] Foreign Application Priority Data

Feb. 14, 1989 [FR] France .................. 89 01891

[51] Int. Cl.$^5$ .................................. C02F 1/28
[52] U.S. Cl. .................. 210/693; 210/502.1; 210/506; 210/924; 210/242.4; 210/692
[58] Field of Search ............ 210/680, 693, 484, 502.1, 210/504, 506, 924, 242.4; 134/7

[56] References Cited

U.S. PATENT DOCUMENTS

| | | | |
|---|---|---|---|
| 3,674,722 | 7/1972 | Rainer et al. | 131/269 |
| 3,756,948 | 9/1973 | Weinberg | 210/693 |
| 3,800,950 | 4/1974 | Hess et al. | 210/924 |
| 3,812,973 | 5/1974 | Stern | 210/924 |
| 3,862,963 | 1/1975 | Hoshi et al. | 210/924 |
| 3,997,467 | 12/1976 | Jederström et al. | 210/924 |
| 4,008,160 | 2/1977 | Vadekar et al. | 210/693 |
| 4,011,159 | 3/1977 | Stein et al. | 210/693 |
| 4,039,489 | 8/1977 | Fletcher et al. | 210/924 |
| 4,401,475 | 8/1983 | Eriksson et al. | 210/924 |
| 5,071,564 | 12/1991 | Stein et al. | 210/484 |

FOREIGN PATENT DOCUMENTS

WO/88/06141 8/1988 WIPO.

*Primary Examiner*—Cynthia L. Nessler
*Attorney, Agent, or Firm*—Finnegan, Henderson, Farabow, Garrett & Dunner

[57] ABSTRACT

Process for the removal of organic pollutants prevalent on a liquid or solid surface by sprinkling a polymer chosen from polybicyclo(2.2.1.) heptene-2 and polymethyl-5-bicyclo(2.2.1) heptene-2. The polymer is first agglomerated using a plasticizing agent. The process is used for the decontamination of water ways.

12 Claims, No Drawings

PROCESS FOR ABSORBING ORGANIC POLLUTING PRODUCTS

This application is a continuation of application Ser. No. 07/582,908, filed Dec. 14, 1990, now abandoned, which was a continuation of PCT application PCT/FR90)00019, filed Jan. 10, 1990, abandoned.

The present invention relates to the field of depollution of liquid or solid surfaces and more particularly to a process for absorbing organic polluting products.

Patent FR-A-2,288,709 describes a process for the removal and recovery of petroleum products, especially heavy hydrocarbons, which are spread over a liquid or solid surface by bringing into contact with the said petroleum product a finely divided polymer capable of producing with the petroleum product a film having a sufficient strength to be capable of being pulled, followed by removal of the said film by mechanical means. A preferred polymer for making use of this process is a polymer of bicyclo[2.2.1]-2-heptene or of its methyl derivative, these polymers forming with petroleum hydrocarbons a coherent film capable of containing up to 10 parts by weight of petroleum products per one part of polymer. This contact of the polymer with the petroleum product is brought about, according to this known process, merely by sprinkling the polymer on the surface of the said product.

Furthermore, in some cases, especially that of transformer oils and that of light hydrocarbons such as domestic fuel, solvents, benzene, toluene and xylenes, the absorbing power of the bicyclo[2.2.1]-2-heptene polymer can reach 15 and even 40 parts by weight of hydrocarbon per 1 part of polymer, while resulting in dry absorbates devoid of any subsequent exudation from the hydrocarbon, even under a pressure of 3 to 70 bars. However, such absorbates do not have a sufficient cohesion to be capable of being removed in the form of a film which can be pulled. They are rather like semi-agglomerated masses which are in the form of gelatin which is difficult to collect and/or to remove.

Finally, the use of the process according to patent FR-A-2,288,709 clashes, on the one hand, with the inadequacy of the kinetics of the absorption of hydrocarbons and/or transformer oils by the bicyclo[2.2.1]-2heptene polymer and, on the other hand, with the aging of this polymer as a result of prolonged storage.

The applicant has found that the problems referred to above, which are linked with the structure of certain absorbates, with the kinetics of absorption and/or of polymer aging, can be judiciously overcome by virtue of the present invention, by plasticizing the said polymer.

Patent application WO 88/06,141 concerns chiefly, with a view to solving the problems presented by the scattering of a powdered polymer in windy weather, the way in which this polymer comes into contact with the polluting products to be absorbed, and proposes to improve the effectiveness of the polymer by enclosing it in a finely meshed protective bag.

Lastly, German patent No. 2,229,361 describes a process for binding oily constituents consisting in spreading thereon a hydrophobic granulate of high porosity.

The present invention consists, therefore, of a process for removing organic polluting products which are spread over a liquid or solid surface by scattering a polymer chosen from polybicyclo[2.2.1]-2-heptene and poly-5-methylbicyclo[2.2.1]-2-heptene, characterized in that the said polymer is agglomerated beforehand, for example by means of at least one agent imparting a certain plasticization thereto, such as a plasticizer and/or an oil.

According to the present invention, the plasticized polymer employed, which is in the form of a coarse powder with an apparent relative density approximately comprised in [sic] 0.15 and 0.50, and with a particle size generally comprised approximately between 0.5 and 10 mm, is obtained by agglomeration of powdered polybicyclo[2.2.1]-2-heptene by means of an agent imparting a certain plasticization thereto, such as relatively nonvolatile compounds having a solidification point lower than $-30°$ C., containing no ethylenic unsaturation and chosen from organic esters derived from aliphatic and alicyclic alcohols, aliphatic, aromatic and naphthenic hydrocarbons and mixtures thereof, in particular dioctyl phthalate, dioctyl sebacate, butyl oleate, adipates, anthracenic oils, chrysene oil, hydrogenates of fractions of tars which have boiling points of between 190° and 500° C., alkylbenzenes, and the like. The proportion of the plasticizing agent relative to the powdered polymer may be comprised between 0.5 and 50% by weight and, preferably, between 5 and 35% by weight approximately.

The agglomerated polymer employed may additionally comprise the following usual adjuvants:

at least one anticaking agent such as a metal stearate, in a proportion ranging up to 5% by weight relative to the polymer, at least one colorant in a conventional proportion, at least one deodorant in a conventional proportion, at least one inorganic filler such as talc, silica, clay, alumina, chalk or fly ash, or else an organic filler such as an olefin or styrene polymer, fibrous or powdered, regenerated or otherwise, compact or expanded, or else a vegetable agent.

The process according to the invention can be applied especially on a liquid surface such as that of a sea, a lake or a watercourse when the organic polluting products have been unfortunately spilt therein. It can also be applied on a solid surface, such as a floor onto which a machine (for example a hydraulic compressor) allows oil to escape. This process is more particularly applicable to the case where the organic polluting product is a petroleum- or petrochemical product, especially a hydrocarbon, a lubricant, a hydraulic fluid, a solvent or a creosote oil. In making use of the process, account will be taken of the capacity for absorbing polluting products with the agglomerated bicyclo[2.2.1]-2-heptene polymer, which varies greatly from one hydrocarbon fraction to another: while it generally attains the order of 1 to 10 parts by weight of hydrocarbon per 1 part by weight of polymer in the case of heavy hydrocarbons, as mentioned by the abovementioned patent FR-A-2,288,709, it has surprisingly been found that it can attain up to 40 parts by weight of hydrocarbons per 1 part by weight of agglomerated polymer in the case of transformer oils and of lighter hydrocarbons such as domestic fuel, benzene, toluene, xylenes, styrene and divinylbenzene.

For this reason, when the organic polluting product is a petroleum product, a quantity of agglomerated polymer is used which is comprised between 1:40 and 1 times the quantity of polluting product to be absorbed.

The time needed for the absorption of the organic polluting products by the agglomerated polymer depends, on the one hand, on the chemical nature of the said polluting products and, on the other hand, on their manner of distribution, compact or dispersed, on the polluted surface. As far as these petroleum products are concerned, this time depends on their viscosity and their aromaticity. In the case of highly aromatic light products, this time is generally approximately between 5 seconds and 1 hour at ambient temperature. In all cases the time needed for the absorption of organic polluting products by the agglomerated polymer is advantageously shorter than the time required by the use of a non-agglomerated powdered polymer.

The examples below are given by way of illustration, without limiting the present invention.

EXAMPLE 1

1.5 kg of domestic fuel oil at room temperature are introduced into a flat-bottomed trough 50 cm long and 30 cm wide. Onto the sheet of fuel oil are sprinkled, in a uniformly distributed manner, 150 grams of powdered polybicyclo[2.2.1]-2-heptene with a particle size of 0 to 0.8 mm and with an apparent relative density of 0.35, to which 1% of stearic acid has been added, and which is marketed by the Norsolor company under the trademark "Norsorex AP". The time tp (in minutes) after the sprinkling, at the end of which all the fuel has solidified, that is to say at the end of which tilting the trough at an angle of 20° no longer produces a flow of free fuel oil, is noted.

This experiment is reproduced with a number of samples of "Norsorex AP" differing in a variable storage time ts (in months) dated from its production.

The results are shown in table I.

TABLE I

| ts | 1 | 2 | 8 | 15 |
|---|---|---|---|---|
| tp | 18 | 25 | 65 | 125 |

EXAMPLE 2

A mixture of 100 parts by weight of freshly prepared "Norsorex AP" with 15 parts by weight of naphthenic petroleum oil marketed by the Nynas company under the trademark "Nytex-00" is produced in a so-called planetary powder mixer (Lancelin trademark). 0.2 parts by weight of cromophtal GFN green colorant ("cromophtal GFN" is a Ciba-Geigy brand name) from the Ciba Geigy company and one part by weight of "Irganox 1076" antioxidant from the Ciba-Geigy company are added during the mixing.

The polymer has absorbed the oil after 10 minutes' mixing and is then in the form of 0.5–2 mm particles and has a bulk density of 0.30 (Product A).

The experiments of example 1 are reproduced with this product by replacing "Norsorex AP" with an identical weight of Product A which has been subjected beforehand to variable storage periods ts (in months) dated from its preparation.

The time tp (in minutes) for complete solidification of domestic fuel oil as a function of the age of the Product A are given in table II.

TABLE II

| ts | 1 | 2 | 8 | 15 |
|---|---|---|---|---|
| tp | 18 | 20 | 23 | 26 |

EXAMPLE 3

The procedure of example 2 is reproduced, apart from the following exception: the quantity of naphthenic oil which is employed is 30 parts by weight instead of 15 parts.

In these conditions the mixing [sic] takes the form of 0.5–10 mm particles and has a bulk density of 0.25 (Product B).

The times tp for solidification of the domestic fuel oil as a function of the previous storage period ts of the product B are given in table III.

TABLE III

| ts | 1 | 2 | 8 | 15 |
|---|---|---|---|---|
| tp | 16 | 18 | 20 | 22 |

We claim:

1. A process for removing organic polluting products spread over a liquid or solid surface comprising scattering over the surface a polymer selected from the group consisting of polybicyclo[2.2.1]-2-heptene and poly-5-methylbicyclo[2.2.1.]-2-heptene, wherein said polymer is agglomerated before scattering by at least one agent imparting plasticization thereto.

2. The process according to claim 1, wherein said agent is selected from the group consisting of dioctyl phthalate, dioctyl sebacate, butyl oleate, adipates, anthracenic oils, chrysene oil, alkylbenzenes, and hydrogenates of fractions of tars having boiling points between 190° and 500° C.

3. The process according to claim 1, wherein said agent is chosen from relatively nonvolatile compounds having a solidification point lower than −30° C., containing no ethylenic unsaturation and chosen from organic esters derived from aliphatic and alicyclic alcohols, aliphatic, aromatic and naphthenic hydrocarbons and mixtures thereof.

4. The process according to claim 1, wherein the proportion of said agent relative to the polymer is between 0.5 and 50% by weight.

5. The process according to claim 1, wherein said polymer has a particle size between 0.5 and 10mm.

6. The process according to claim 1, wherein said polymer has an apparent relative density between 0.15 and 0.50.

7. The process according to claim 1, wherein the proportion of said agent relative to the polymer is between 5 and 35% by weight.

8. The process according to claim 1, wherein the weight ratio of agglomerated polymer to organic polluting product is between 1:40 and 1:1.

9. The process according to claim 1, wherein the organic polluting products are petroleum or petrochemical products.

10. The process according to claim 9, wherein said petroleum or petrochemical product is selected from the group consisting of hydrocarbons, lubricants, hydraulic fluids, solvents and cresote oils.

11. The process according to claim 1, wherein the agglomerated polymer additionally comprises at least one anticaking agent.

12. The process according to claim 11, wherein a metal stearate is employed as anticaking agent.

* * * * *